Feb. 15, 1927.
H. C. MALLORY
1,617,491
PROCESS OF MAKING EXPANSIBLE COLLAPSIBLE ELEMENTS
Filed Aug. 31, 1920        2 Sheets-Sheet 1
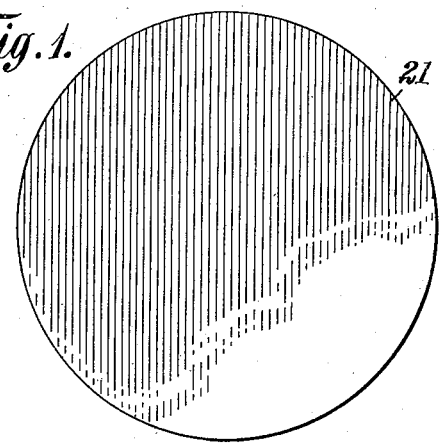
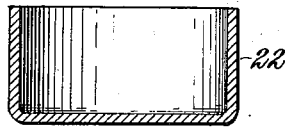
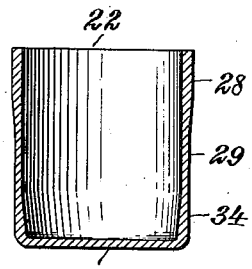
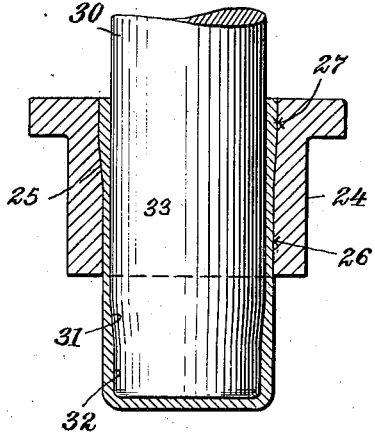
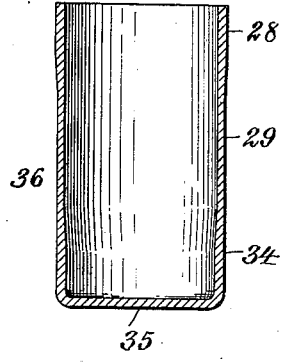
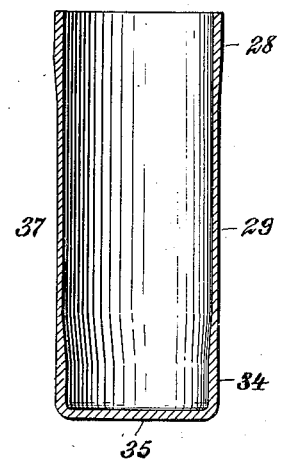
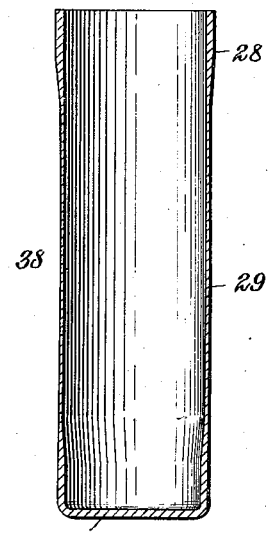
Inventor
Harry C. Mallory
By Conrad A. Dieterich
his Attorney Feb. 15, 1927.

H. C. MALLORY 1,617,491

PROCESS OF MAKING EXPANSIBLE COLLAPSIBLE ELEMENTS

Filed Aug. 31, 1920    2 Sheets-Sheet 2

Inventor
Harry C. Mallory
By Conrad A. Willard
his Attorney

Patented Feb. 15, 1927.

1,617,491

UNITED STATES PATENT OFFICE.

HARRY C. MALLORY, OF BELLPORT, NEW YORK, ASSIGNOR, BY MESNE ASSIGNMENTS, TO AMERICAN RADIATOR COMPANY, OF CHICAGO, ILLINOIS, A CORPORATION OF NEW JERSEY.

PROCESS OF MAKING EXPANSIBLE COLLAPSIBLE ELEMENTS.

Application filed August 31, 1920. Serial No. 407,205.

My invention relates to improvements in processes of making flexible or elastic elements adapted for use in connection with apparatus or devices, subject to or influenced by temperature or pressure variations, whereby to operate a valve or other apparatus or mechanisms.

Further, said invention has for its object to provide a process of making a flexible or elastic element to be interposed between two or more parts of an apparatus or device certain of which are movable with respect to the other thereof, to form a flexible fluid-tight joint yieldingly connecting said parts.

Further, said invention has for its object to provide a process of making an expansible-collapsible element in the form of a cylindrical body which is transversely corrugated, and has one or both of its ends extending from said corrugated portion of relatively greater thickness to facilitate the attachment of said element to other members or parts.

Other objects will in part be obvious, and in part be pointed out hereinafter.

To the attainment of the aforesaid objects and ends my invention consists in the novel and successive steps constituting the method of production hereinafter described and then pointed out in the claims.

In the accompanying drawings forming part of this specification wherein like numerals of reference indicate like parts,—

Figure 1 is a face view of a blank from which my improved expansible-collapsible element may be made;

Fig. 2 shows a shallow, cup-like shell drawn from said blank;

Fig. 3 shows the same shell after it has been subjected to further drawing operations;

Fig. 4 shows a shell engaged by a set of dies for further shaping the same; certain of the dimensions of the parts being exaggerated in order better to explain the same;

Figs. 5, 6 and 7 show the shell after having been subjected to the successive action of additional dies.

Figure 9:
Figure 10:
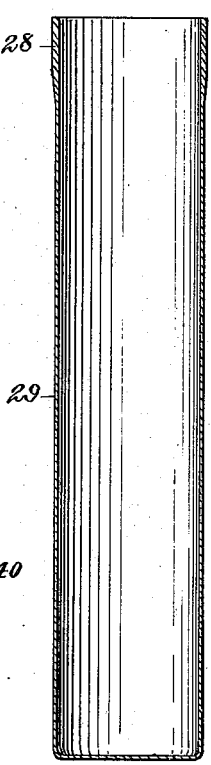
Figure 11:
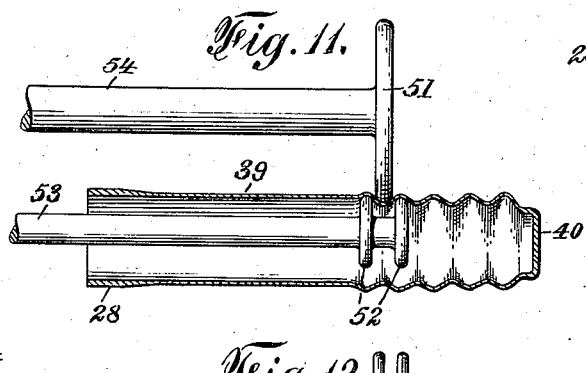
Figure 12:
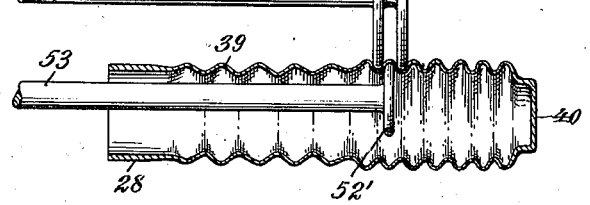
Figure 13:
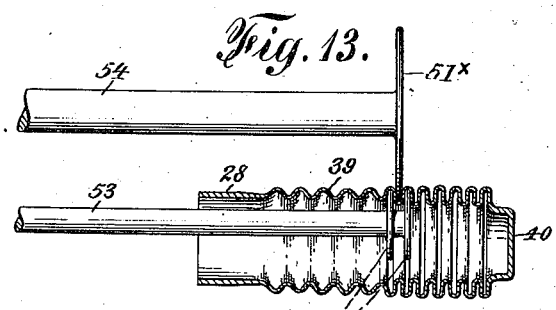

Fig. 9 shows the shell after the same has been subjected to suitable dies and circumferentially corrugated, Fig. 10 shows a modified form of shell in which the closed end is of substantially the same thickness as its intermediate cylindrical wall portion, but its open end wall portion is of relatively greater thickness, and Figs. 11, 12, 13, are diagrammatic views illustrating the process of forming intermediate corrugations, such as are illustrated at Fig. 9.

I produce an expansible-collapsible element by taking a round, sheet brass blank 21 of proper thickness, and by ordinary die processes draw the same to form a shallow cup 22. The cup 22 is thereupon subjected to the successive action of additional dies to increase the length of the shell, and at the same time decrease the thickness of its intermediate wall portion 29, and leaving its closed end 35, and the wall portion 34 adjoining the same, as well as the wall portion 28 at its open end of greater thickness. The difference in the thickness of the end portions of the shell, as compared with its intermediate portion results from the action of dies formed as shown at Fig. 4. In said figure the die member 24 has a slightly tapered portion 25 provided intermediate the cylindrical portions 27 and 26 thereof which are respectively larger and smaller in diameter than the top and bottom of said tapered portion 25 with which the same merge.

The internal die member 30 has a tapering portion 31 whose upper and lower portions merge with the larger and smaller cylindrical portions 33, 32, respectively, of the die member 30. It will be seen, from Fig. 4, how said dies 24, 30 cooperate to convert the shell structure illustrated at Fig. 2, into that shown at Fig. 3.

By the repeated action of additional dies the shell is gradually drawn out, and the cylindrical walls elongated and reduced in diameter, in successive stages resulting in structures as 36, 37 and 38, shown at Figs. 5, 6 and 7, respectively.

Figure 8:
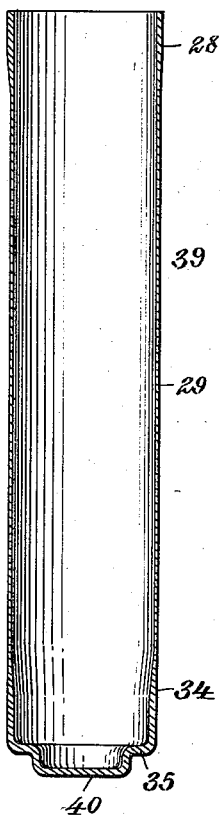
Fig. 8 shows the same shell after the same has been subjected to the dies and a boss produced at its closed end.

When the shell has been elongated to the desired length and the walls correspondingly reduced in thickness and caused to assume the proportions illustrated by the structure 39, Fig. 8, the closed end of said structure is subjected to the action of a suitable set of dies to form the outwardly projecting boss 40.

Hereupon the intermediate or body portion of the shell 39 is subjected, in succession, to the action of several sets of dies, as shown at Figs. 11, 12 and 13.

The two shafts 53 and 54 carry at their ends respectively the two internal rollers or dies 52, and the external roller or die 51. The shafts are rotated by gearing so as to make the dies turn at approximately the same peripheral speed and in the same direction where their peripheries are closest together. The shell is introduced between these dies and the first operation, as shown in Fig. 11, is to roll comparatively wide shallow corrugations in the shell with their crests and bases respectively without and within the original cylindrical contour of the shell. Next, the shell is introduced between the dies 52' and 51' as shown in Fig. 12. In this case the paired dies 51' are closer together than the paired dies 52 in Fig. 11, and also they are on the outside instead of on the inside. By this operation, the corrugations are deepened and the element made of less longitudinal extent.

By successive operations similar to the foregoing, the corrugated shell can be brought to the desired final form, by dies 51ˣ, 52ˣ, as shown at Fig. 13. In these successive operations the double dies, like 51 in Fig. 11, 51' in Fig. 12 and 52ˣ in Fig. 13, are alternately internal and external, and are arranged closer and closer together as they progress, as will be seen by comparing the spacing of the dies 51' and 52 with the dies 52ˣ. In the final product, the corrugations extend approximately equal distances beyond and within the original cylindrical contour, that is, the corrugations are half outside and half inside the original cylindrical contour of the shell.

It is to be noted that the gradual tapering of the end part or parts of the structure towards the thinner corrugated portions with which the same merge serves as a means for gradually absorbing or distributing the flexing movement between the relatively movable and rigid parts of the structure. By this construction and arrangement of the several parts of the expansible-collapsible element any abrupt or sharp flexing of the parts is avoided, and as a result the durability or life of the element very greatly enhanced.

It will be observed that by producing expansible-collapsible elements according to my process, as hereinabove set forth, the amount of hand work is greatly reduced and the article may be produced almost entirely as a machine product.

This application is a continuation in part of my earlier application, Serial No. 833,- 593, filed April 22, 1914, renewed December 5, 1919, Serial No. 342,802, and patented January 25, 1921, No. 1,366,473.

Having thus described my said invention, what I claim and desire to secure by Letters Patent is:—

1. The process of making an expansible-collapsible element which consists in forming a shell from a metal blank, reducing the thickness of a part thereof and leaving the remainder thereof of relatively greater thickness, and finally circumferentially corrugating said reduced portion, substantially as specified.

2. The process of making an expansible-collapsible element which consists in taking a metal blank, forming said blank by a succession of steps to form a shell having a thin body portion, and an end portion of relatively greater thickness, and finally circumferentially corrugating said relatively thin body portion, substantially as specified.

3. The process of making an expansible-collapsible element which consists in forming a shell from a metal blank by successive stages, and at certain of said stages reducing the body portion of said shell whereby to leave an end portion of relatively greater thickness, and finally circumferentially corrugating the reduced body portion, substantially as specified.

4. The process of making an expansible-collapsible element which consists in forming a cylindrical shell from a metal blank, and at certain stages reducing a portion of the cylindrical wall of said shell, and leaving the remainder thereof of greater thickness, and finally circumferentially corrugating said reduced wall portion, substantially as specified.

5. The process of making an expansible-collapsible element which consists in forming from a metal blank a shell with one end closed, reducing the thickness of a portion of said shell at points removed from said end to a greater extent than said end, and finally circumferentially corrugating said reduced portion of said shell, substantially as specified.

6. The process of making an expansible-collapsible element which consists in forming a shell with an open end from a metal blank by successive stages, and in the later of said stages reducing the thickness of the wall thereof to a greater extent at points removed from said open end than at said open end, and finally circumferentially corrugating said reduced portion of said shell, substantially as specified.

7. The process of making an expansible-collapsible element which consists in taking a metal blank, forming the same in successive steps to form a shell having a body portion, an end portion of relatively greater thickness, and a portion of diminishing thickness uniting said end portion with said body portion, and circumferentially corrugating said body portion, substantially as specified.

8. The process of making an expansible-collapsible element which consists in taking a metal blank, forming the same in successive steps to form a shell having a body portion, an end portion of relatively greater thickness, and an intermediate annular portion of diminishing thickness uniting said end portion with said body portion, and finally circumferentially corrugating said body portion, substantially as specified.

9. The process of making an expansible-collapsible element which consists in taking a metal blank, forming the same in successive steps to form a shell having a body portion, and end portions of relatively greater thickness, and intermediate portions of diminishing thickness uniting said end portions with said body portion, and finally circumferentially corrugating said body portion, substantially as specified.

10. The process of making an expansible-collapsible element which consists in forming a shell comprising a body portion and an integral closed end, and one end portion thicker than said body portion, and finally circumferentially corrugating said body portion, substantially as specified.

11. The process of making an expansible-collapsible element which consists in forming a shell comprising a body portion and an integral closed end of greater thickness than said body portion, and finally circumferentially corrugating said body portion, substantially as specified.

12. The process of making an expansible-collapsible element which consists in forming a cylindrical shell with one integral closed end, and an open end whose walls are thicker than the intermediate wall, and then circumferentially corrugating said intermediate wall, substantially as specified.

13. The process of making an expansible-collapsible element which consists in drawing from a metal blank a shell with one end closed and its other end open, reducing the thickness of the intermediate wall more than the walls of said end portions, and finally circumferentially corrugating said intermediate wall, substantially as specified.

14. The process of making an expansible-collapsible element which consists in drawing from a metal blank a shell with one end closed and its other end open, reducing the thickness of the intermediate wall more than the walls of said end portions, forming a portion of gradually varying thickness joining said end portions with said intermediate portion, and finally circumferentially corrugating said intermediate wall, substantially as specified.

15. The process of making an expansible-collapsible element which consists in forming a shell from a metal blank in successive stages and at certain of said stages, forming the wall of said shell with a thicker portion at one of its ends, extending inwardly beyond the normal metal line of said wall, and finally circumferentially corrugating the portion of said shell at points removed from said thicker portion, substantially as specified.

16. The process of making an expansible-collapsible element which consists in drawing a shell from a metal blank in successive stages and at certain of said stages using an internal die of reduced diameter near its extremity, whereby to form the wall of said shell with a thicker portion at its corresponding end portion, extending inwardly beyond the normal metal line of said wall, and finally corrugating the portion of the shell merging with said thicker portion, substantially as specified.

17. The process of making an expansible-collapsible element which consists in forming a shell from a metal blank in successive stages and at certain of said stages forming the wall of said shell of greater external diameter at one of its ends, and finally circumferentially corrugating the portion of said shell merging with said end of greater external diameter, substantially as specified.

18. The process of making an expansible-collapsible element which consists in drawing a shell having an open end from a metal blank in successive stages and at certain of said stages using an external die of greater diameter near its one end whereby to form the wall of said shell of greater external diameter near its open end, and finally circumferentially corrugating the portion of said shell merging with said open end, substantially as specified.

19. The process of making an expansible-collapsible element which consists in forming from a metal blank a shell having an open end and a closed end, in successive stages and at certain of said stages forming the wall of said shell of smaller internal diameter near its closed end, and of greater external diameter near its open end, and finally circumferentially corrugating the intermediate wall portion of said shell, substantially as specified.

20. The process of making an expansible-collapsible element which consists in drawing a shell having an open end and a closed end from a metal blank in successive stages and at certain of said stages using an internal die of reduced diameter near its extremity, and an external die of increased diameter at the opposite end whereby to form the wall of said shell of smaller internal diameter near its closed end, and of greater external diameter near its open end, and finally circumferentially corrugating the intermediate portion of said shell, substantially as specified.

21. The process of making an expansible-collapsible element which consists in forming a shell from a metal blank in successive stages and at certain of said stages subjecting said shell to the action of dies having transverse portions varying in diameter whereby to form a shell having a wall of greater thickness at its end portions than at its intermediate portion, and finally circumferentially corrugating said intermediate portion, substantially as specified.

Signed at the city of New York, New York County, in the State of New York, this first day of June, one thousand nine hundred and twenty.

HARRY C. MALLORY.